Aug. 25, 1959 T. A. McCOY 2,901,085
ELEVATING AND CENTERING DEVICE FOR CYLINDRICAL BODIES
Filed Dec. 8, 1958 3 Sheets-Sheet 1

INVENTOR.
Thomas A. McCoy
BY
Webster & Webster
ATTYS.

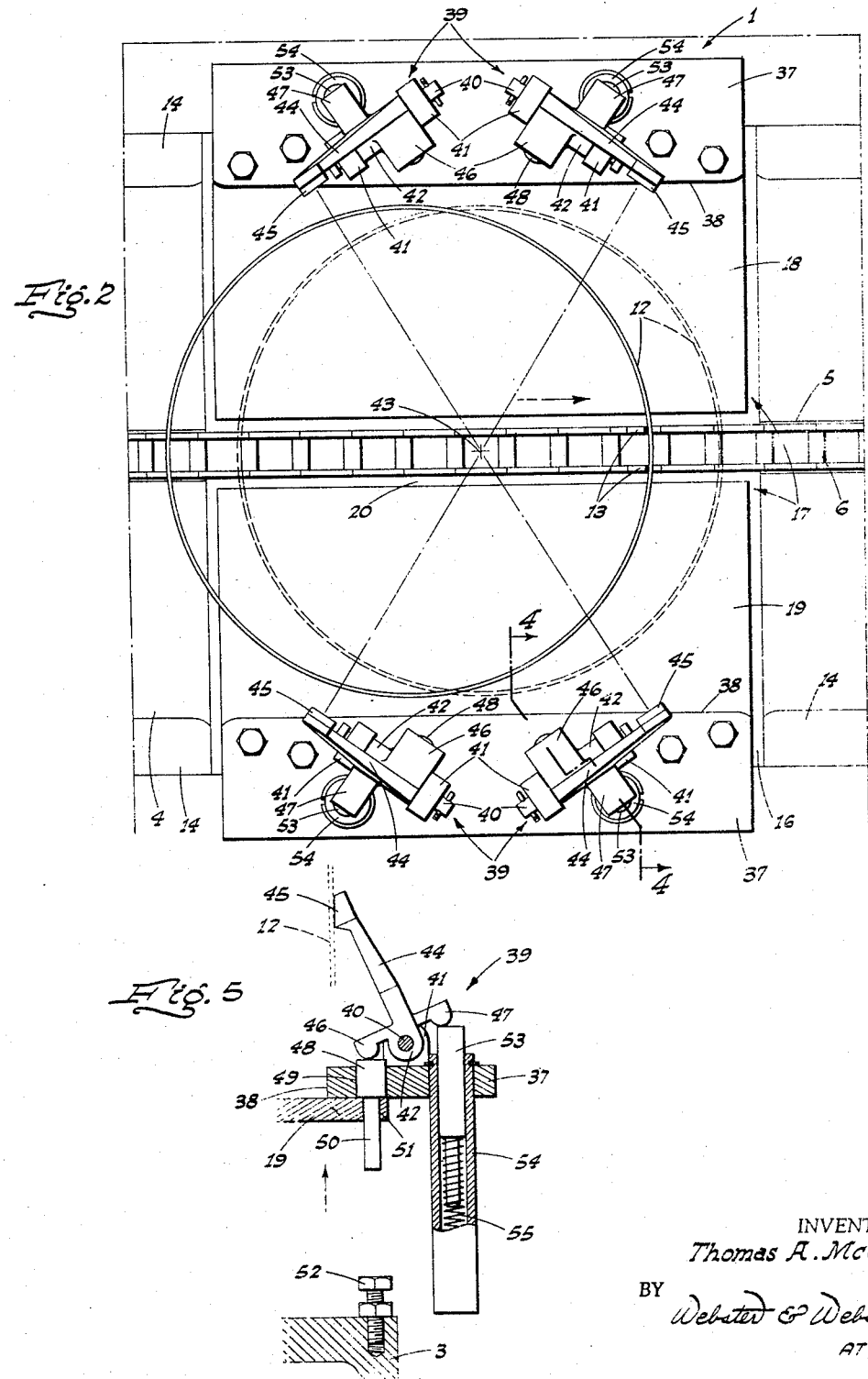

Aug. 25, 1959 T. A. McCOY 2,901,085
ELEVATING AND CENTERING DEVICE FOR CYLINDRICAL BODIES
Filed Dec. 8, 1958 3 Sheets-Sheet 3
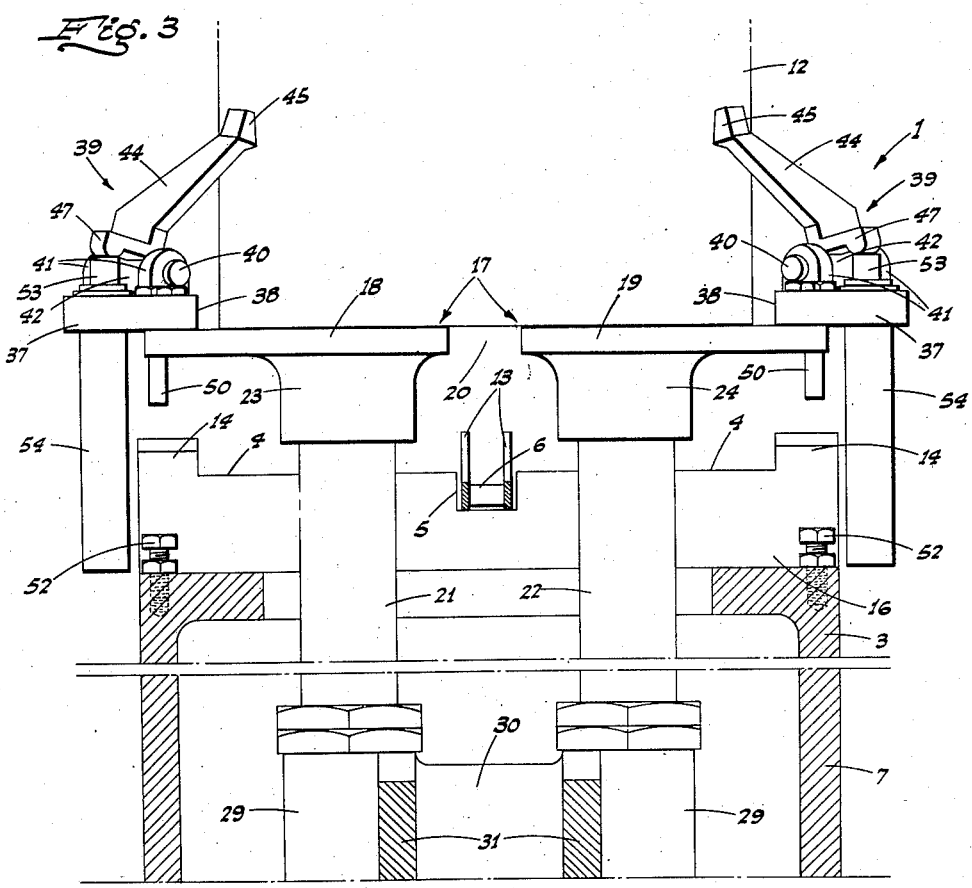
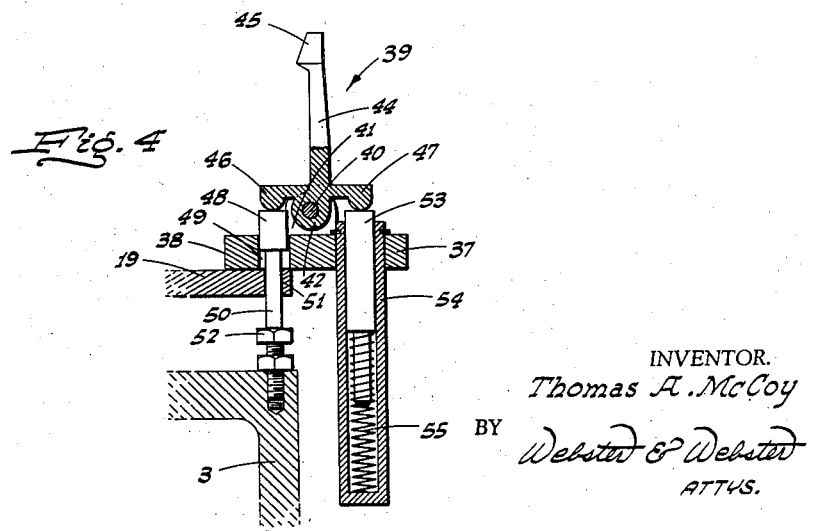
INVENTOR.
Thomas A. McCoy
BY
Webster & Webster
ATTYS.

United States Patent Office 2,901,085
Patented Aug. 25, 1959

2,901,085

ELEVATING AND CENTERING DEVICE FOR CYLINDRICAL BODIES

Thomas A. McCoy, Stockton, Calif., assignor to Carando Machine Works, Stockton, Calif., a partnership Application December 8, 1958, Serial No. 778,783

17 Claims. (Cl. 198—29)

This invention relates in general to apparatus adapted for use in the manufacture of metallic drums or pails which include an initially open-ended, cylindrical shell or body. In particular the invention is directed to—and it is a major object to provide—a novel device adapted to receive such a drum (or pail) body in a vertical position and to then elevate such drum body to an overhead machine which performs a metal working operation thereon; such device being operative, as the drum body is being elevated, to precisely center it relative to—and for accurate engagement in—said overhead machine.

Another important object of the present invention is to provide a drum body elevating and centering device, as above, which includes a vertically movable, drum body receiving platform, and a plurality of gripping units mounted on the platform in position to engage and center a drum body thereon; such gripping units functioning in response to raising movement of said platform.

An additional object of the invention is to provide a drum body elevating and centering device, as in the preceding paragraph, wherein said gripping units are disposed on the platform to engage a drum body thereon at circumferentially spaced points; the platform being vertically reciprocable between a lowered position and a raised position, and the gripping units comprising upstanding gripping arms pivotally mounted on the platform for swinging movement between an out-swung or clearance position, and an in-swung or drum body engaging and centering position. Plungers and rocker assemblies, which are responsive to reciprocating movement of the platform, are associated with the gripping units and are operative to dispose the gripping arms in said out-swung position when the platform is lowered, and to dispose said gripping arms in an in-swung position to engage and center the supported drum body when said platform is raised.

A further object of the invention is to provide a drum body elevating and centering device which is arranged in novel combination with a driven endless conveyor; the latter being adapted to feed each drum body to and from said device in timed relation to operation of the latter.

It is also an object of the invention to provide a drum body elevating and centering device which is designed for ease and economy of manufacture; accurate high speed operation; and long service, with a minimum of maintenance and repair being required.

Still another object of the invention is to provide a practical, reliable, and durable drum body elevating and centering device, and one which will be exceedingly effective for the purpose for which it is designed.

These objects are accomplished by means of such structure and relative arrangement of parts as will fully appear by a perusal of the following specification and claims.

In the drawings:

Fig. 2 is an enlarged fragmentary plan view taken on line 2—2 of Fig. 1; the view showing the drum body and elevating device with the gripping arms in clearance position.

Fig. 3 is an enlarged transverse sectional elevation on line 3—3 of Fig. 1; the view showing the platform raised and with the gripping arms in drum body engaging and centering position.

Fig. 4 is a fragmentary sectional elevation taken on line 4—4 of Fig. 2; the view showing one of the gripping units with the gripping arm in clearance position, as when the platform is lowered.

Fig. 5 is a similar view but shows such gripping unit with the gripping arm in drum body engaging and centering position, as when the platform is raised.

Figure 1:
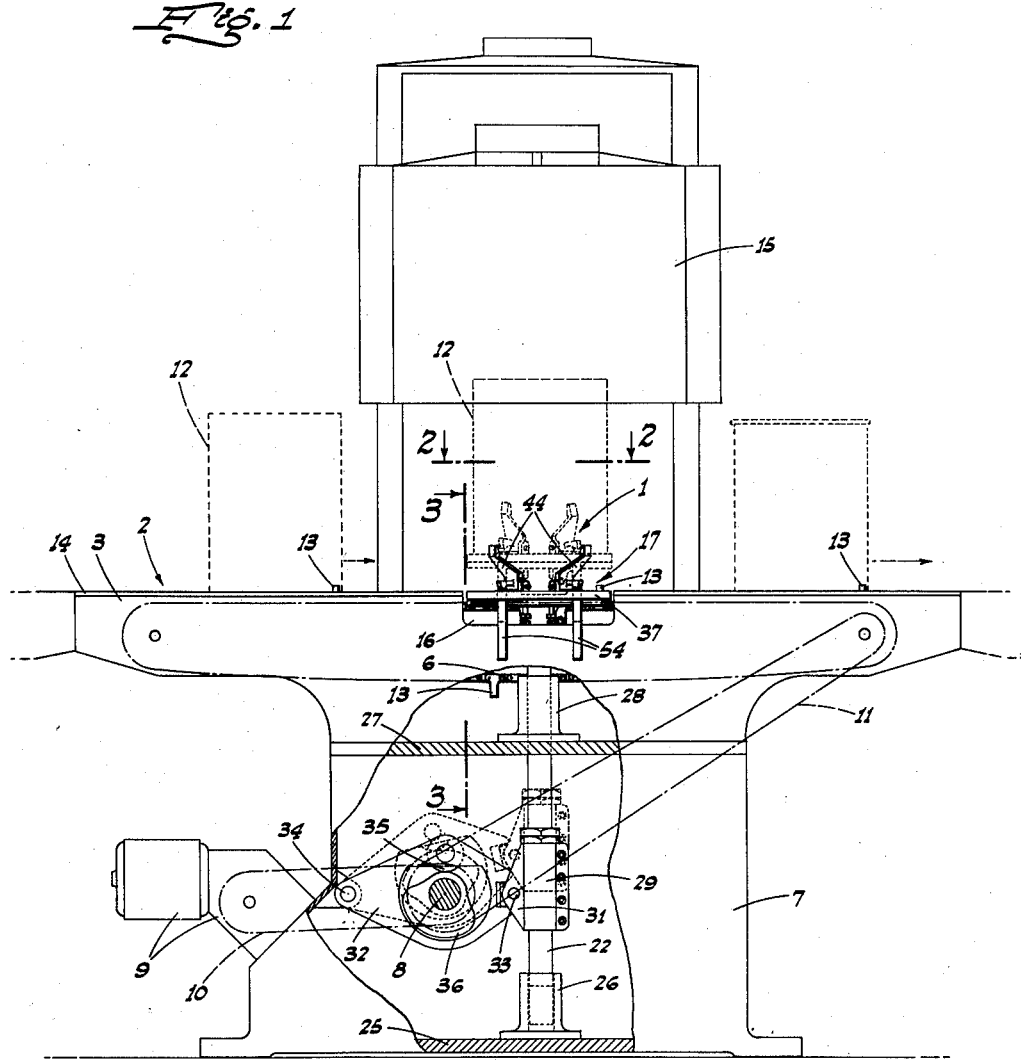
Fig. 1 is a somewhat diagrammatic side elevation, partly broken away and partly in section, of an endless chain type conveyor embodying the drum body elevating and centering device; the view illustrating certain of the progressive positions of a drum body.

Referring now more particularly to the drawings, and to the characters of reference marked thereon, the drum body elevating and centering device is shown generally at 1, and such device—whose structure is hereinafter described in detail—is mounted in connection with an endless chain type, horizontal conveyor, indicated generally at 2.

The conveyor 2 comprises a longitudinal or horizontally extending frame 3 having a bed 4 formed with a central longitudinal guide channel 5 which receives the upper run of an endless conveyor chain 6 mounted in the frame 1; the upper run of said chain 6 traveling from left to right in Fig. 1.

In addition to the longitudinal frame 3—which occupies an above-floor position—the conveyor 2 includes a hollow pedestal 7 which supports said frame 3; there being a cross shaft 8 journaled in the pedestal 7 and driven from an electric motor and gear box unit 9 by means of an endless drive 10. The endless chain 6 is driven from the cross shaft 8 by another endless drive 11.

Each drum body 12 is fed onto the horizontal conveyor 2 at the left hand end in Fig. 1, and is thence picked up and advanced by a lug 13 traveling in the upper run of the conveyor chain 6; the drum body 12, as advanced on the longitudinal bed 4, being caused to properly track lengthwise thereon by means of upstanding longitudinal guides 14 on opposite sides of such bed.

The conveyor 2 extends—centrally of its ends—below an overhead machine, indicated at 15, and which machine is operative, upon elevation of a drum body thereinto, to swage or die-curl a bead—or to conduct some other similar operation—on the upper end of such drum body. The machine 15 forms no part of the present invention, and is thus shown merely diagrammatically As each drum body 12 is advanced on the longitudinal bed 4 it passes onto the drum body elevating and centering device 1, and which device comprises the following:

The conveyor 2 is formed—centrally of its ends—with a full width, transverse recess 16, and a horizontal, rectangular, vertically reciprocable platform, indicated generally at 17, initially occupies a position in said recess and with the upper surface of said platform 17 flush with the bed 4.

The platform 17 is comprised of two rectangular platform sections 18 and 19 disposed in spaced apart relation at their inner or adjacent edges, whereby to define an open-ended longitudinal slot 20 through which the upper run of the chain 6 travels when said platform 17 is in its lowered position; each lug 13 projecting—when in the zone of the platform 17—above the upper surface thereof.

The platform sections 18 and 19 are maintained in rigid unitary relation, and for simultaneous vertical reciprocation, by means of corresponding posts 21 and 22, which extend downwardly from said sections 18 and 19, respectively.

The sections 18 and 19 are formed on the under side with sockets 23 and 24, respectively, and in which sockets the upper ends of the posts 21 and 22 are secured. The posts 21 and 22 extend downwardly into the pedestal 7 and at their lower ends said posts are slidably received in guides mounted on the base 25 of said pedestal, and one of which guides is indicated at 26. Intermediate their ends, but below the frame 3, the posts 21 and 22 also extend through other guides mounted on a horizontal plate 27 in said pedestal 7; one of such other guides being indicated at 28.

The posts 21 and 22, together with the platform 17 mounted thereon, are vertically reciprocated in timed relation to movement of the conveyor chain 6 by the following mechanism actuated from the cross shaft 8:

Between the plate 27 and the guides 26 the posts 21 and 22 have clamping sleeves 29 thereon; such clamping sleeves being connected in integral relation by an intermediate web 30.

Transversely spaced ears 31 project from the clamping sleeves 29 in the direction of the cross shaft 8, and a rocker arm 32 is pivotally and slidably connected at one end, as at 33, between said ears 31. From the ears 31 the rocker arm 32 extends in the direction of—and to a point beyond—said cross shaft 8, and at the remote end is pivoted, as at 34, to the adjacent side of the pedestal 7.

The rocker arm 32 is provided with a roller 35 which serves as a cam follower, and which rides on the top of a profiled cam 36 fixed on cross shaft 8. Thus, with rotation of cross shaft 8, the profiled cam 36 and cam follower roller 35 act to cause reciprocation of the posts 21 and 22, the platform 17, in timed relation to the endless conveyor chain 6.

Each of the platform sections 18 and 19 is fitted—at the outer side portion, and on top—with a longitudinal mounting plate 37; each plate projecting beyond the adjacent outer edge of the related platform section 18 or 19, while the inner edge of each mounting plate serves as a guide 38 corresponding to—and alined with—the adjacent longitudinal guide 14.

Each mounting plate 37 is fitted with a pair of longitudinally spaced gripping units, indicated generally at 39. The gripping units 39 each include a horizontal shaft 40 journaled at its end portions in ears 41 secured on and upstanding from the relating mounting plate 37; the shaft 40 being spaced above said plate 37, and a sleeve 42 is turnable on said shaft.

The ears 41 are disposed so that the shafts 40 (and sleeves 41 thereon) of the pair of units 39, on each plate 37, diverge laterally inwardly from their adjacent ends. Further, the gripping units 39 on each mounting plate 37 are positioned equi-distant from, but on opposite sides of, a transverse vertical plane extending through the theoretical center point 43 of platform 17.

Each sleeve 42 is formed with an integral, upstanding gripping arm 44 which extends at an upward incline from the sleeve in the longitudinal vertical plane thereof, and in the direction of the adjacent end of platform 17; the gripping arm having a head 45 on its upper or free end, and such head generally faces the center point 43 of said platform.

The bearing sleeve 42, of each gripping unit 39, is formed with oppositely projecting rockers, indicated at 46 and 47. The rocker 46 is adapted for engagement, from below, by a vertical plunger 48 carried in a bore 49 in the related mounting plate 37; such plunger 48 including a reduced-diameter, depending shank 50 which slidably projects through—and depends a distance below—a bore 51 in the corresponding platform section 18 or 19.

The depending shank 50 is vertically alined with an adjustable stop bolt 52 secured in connection with—and upstanding from—the adjacent side of the longitudinal frame 3.

When the platform 17 is in its starting or lowered position, as in full lines in Fig. 1, the depending shank 50 is abutted by the stop bolt 52 and urged upwardly, whereby the plunger 48 is shifted to a raised position, which results in the corresponding gripping arm 44 being out-swung to a clearance position (see Fig. 4).

The other rocker 47 is engaged from below by an upwardly spring-urged plunger 53 carried in a closed-bottom guide tube 54 which extends through and depends from the related mounting plate 37 outwardly of the adjacent side of the longitudinal frame 3. A compression spring 55 is carried in guide tube 54 between the bottom thereof and said plunger 53.

When the platform 17 is lowered, with the shank 50 engaging stop bolt 52 with resultant raising of plunger 48 and rocker 46 to dispose the gripping arm 44 in its out-swung or clearance position, the rocker 47 has depressed the plunger 15 against spring 55.

When the platform—during reciprocation thereof—moves from its lowered position, as in full lines in Fig. 1, to its raised position, as in dotted lines in said figure, the shank 50 escapes the bolt 52 and the spring-urged plunger 53—acting against the rocker 47—shifts the gripping arm 44 inwardly to a drum body engaging and centering position, as in Fig. 5.

The drum body elevating and centering device 1, in association with the conveyor 2, functions as follows:

Each drum body 12 is delivered to the forward end portion of the horizontal conveyor 2 by suitable mechanism, and is thence picked up by one of the lugs 13 and advanced on the longitudinal bed 4 until such drum body 12 is in the main located above the initially lowered platform 17, and which position of the drum body is substantially indicated by the full line position thereof in Fig. 2. At such time the platform 17, under the action of the profiled cam 36, is caused to raise, lifting the then platform-supported drum body 12 clear of the engaged or driving lug 13, but which—because of the relatively high speed of the conveyor 2—must occur before said drum body is fully centered on said platform relative to the center point 43. It therefore becomes necessary that said platform-supported drum body 12, with continued upward travel or raising of the platform, be accurately centered thereon. This is accomplished by the gripping units 39 as follows:

As the platform 17 raises, the shanks 50 escape the bolts 52, and the spring-urged plungers 53 swing the gripping arms 44 inwardly, whereupon such arms engage adjacent sides of the platform-supported drum body. By reason of the disposition of the gripping units 39 on each mounting plate 37, said gripping units engage the platform-supported drum body on opposite sides of its central transverse diametral plane, which results in said drum body being shifted on the platform until said drum body is precisely centered relative to the center point 43.

This occurs during the upward travel or raising of the platform 17, but before it reaches its upper limit of movement, hence the platform-supported drum body 12 is—when its upper end reaches the overhead machine 15—accurately centered for entry into the latter and for the metal working operation on said drum body.

After such operation takes place, which is very fast, the platform 17—and the drum body thereon—lowers to its starting position; the gripping arms 44 by then having been out-swung and released from the drum body by reason of the engagement of the shanks 50 with the stop bolts 52. As soon as this occurs—and by reason of the timing of the endless conveyor chain 6 and the positioning of the lugs 13 thereon—one of such lugs picks up the platform-supported drum body and carries it therefrom and forwardly on said conveyor 2.

With the described drum body elevating and centering device 1, each drum body—as fed to the platform 17—is positively and accurately centered on said platform, and raised into the overhead machine 15 in proper position, irrespective of the exact point at which the drum body is released from the conveyor chain 6 as said body initially enters onto the platform.

The device 1 therefore serves a very practical and useful purpose, and by reason of its structure functions automatically and in correctly timed relation to the reciprocation of the platform 17.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. An elevating and centering device, for an upstanding cylindrical body, comprising a frame, a horizontal platform mounted on the frame for vertical reciprocation between an initially lowered position and a raised position, means to reciprocate the platform, and means mounted on the platform operative to engage and center a cylindrical body on said platform upon upward movement thereof from its lowered position.

2. An elevating and centering device, as in claim 1, in which said last named means is responsive to such upward movement of the platform.

3. An elevating and centering device, for an upstanding cylindrical body, comprising a frame, a horizontal platform mounted on the frame for vertical reciprocation between an initially lowered position and a raised position, means to reciprocate the platform, and means mounted on the platform operative to engage and center a cylindrical body on said platform upon upward movement thereof from its lowered position; said last named means including members swingable between an initial position clear of a platform supported cylindrical body and a body engaging and centering position, cooperative elements between said members and frame operative only when the platform is in lowered position acting to maintain such members in said clearance position, and instrumentalities between the platform and said members acting upon upward movement of said platform to swing such members to said body engaging and centering position.

4. An elevating and centering device, as in claim 3, in which said cooperative elements include vertically slidable plungers on the platform, and stops on the frame; the plungers abutting the stops and being relatively slid upward when the platform is in lowered position.

5. An elevating and centering device, as in claim 3, in which said instrumentalities include springs yieldably urging the members toward said body engaging and centering position.

6. An elevating and centering device, for an upstanding cylindrical body, comprising a frame, a horizontal platform mounted on the frame for vertical reciprocation between an initially lowered position and a raised position, means to reciprocate the platform, a plurality of upstanding gripping arms pivotally mounted on the platform for swinging movement between a clearance position outwardly of a cylindrical body on the platform and an inward body engaging and centering position, means between the platform and frame arranged to swing the arms to clearance position when said platform is lowered, and means between the platform and arms arranged to swing the arms to said body engaging and centering position when the platform is raised.

7. An elevating and centering device, as in claim 6, in which said arms are disposed on the frame so that, in said body engaging and centering position, at least a pair of said arms engage the body at circumferentially spaced points on each of opposed sides thereof, and with the corresponding arms of said pairs alined transversely of said body.

8. An elevating and centering device, as in claim 6, in which said means between the platform and frame includes vertically slidable plungers on the platform and stops on the frame; the plungers engaging the stops and relatively slid upward when the platform is lowered, and means between the plungers and arms arranged to dispose the latter in said clearance position when said plungers are so slid upward.

9. An elevating and centering device, as in claim 6, in which said means between the platform and arms includes upwardly spring pressed plungers, and means between said spring pressed plungers and arms arranged to translate upward movement of the plungers into swinging movement of the arms to said body engaging and centering position.

10. An elevating and centering device, for an upstanding cylindrical body, comprising a frame, a horizontal platform mounted on the frame for vertical reciprocation between an initially lowered position and a raised position, means to reciprocate the platform, a plurality of upstanding gripping arms pivotally mounted on the platform for swinging movement between a clearance position outwardly of a cylindrical body on the platform and an inward body engaging and centering position, opposed rockers rigid with each arm and projecting laterally in opposite directions relative to the pivotal axis thereof, vertically movable plungers mounted on the platform beneath and for upward engagement with the rockers of each arm, spring means operative to yieldably raise those certain plungers which cause the related rockers to swing the arms to said body engaging and centering position, the remaining plungers depending below the platform, and means on the frame positioned to abut and relatively raise said remaining plungers when the platform is in lowered position whereby to then cause the corresponding rockers to swing the arms to said clearance position.

11. An elevating and centering device, for an upstanding cylindrical body, comprising a frame, a horizontal platform mounted on the frame for vertical reciprocation between an initially lowered position and a raised position, means to reciprocate the platform, a plurality of upstanding gripping arms pivotally mounted on the platform for swinging movement between a clearance position outwardly of a cylindrical body on the platform and an inward body engaging and centering position, opposed rockers rigid with each arm and projecting laterally in opposite directions relative to the pivotal axis thereof, each arm being swung to said body engaging and centering position upon upward movement of one rocker and swung to said clearance position upon upward movement of the other rocker, plungers on the platform positioned to engage each rocker from below, and means operative upon raising and lowering of the platform to cause the corresponding plungers to move said one rocker and said other rocker upwardly, respectively.

12. An elevating and centering device, for an upstanding cylindrical body, comprising a frame, a horizontal platform, a vertical post assembly having the platform fixed on its upper end, means mounting the post assembly on the frame for vertical reciprocation of the platform between an initially lowered position and a raised position, means to reciprocate the post assembly, and means mounted on the platform operative to engage and center a cylindrical body on said platform upon and in response to upward movement thereof from its lowered position.

13. An elevating and centering device, as in claim 12, including a conveyor on the frame; said conveyor being adapted to feed a cylindrical body onto the platform when the latter is in lowered position, and to feed said body away from the platform after reciprocation thereof and return to said lowered position.

14. An elevating and centering device, as in claim 13, in which the conveyor includes an endless driven conveyor chain having an upper longitudinal run; the platform being comprised of separate transversely spaced sections which define an open ended longitudinal slot therebetween, said upper run of the chain being disposed in the slot when the platform is in lower position, and body engaging and advancing lugs on the chain, said lugs projecting upwardly from said upper run of the chain and above the platform when in the zone thereof; the chain being driven in predetermined timed relation to reciprocation of the platform.

15. An elevating and centering device, for an upstanding cylindrical body, comprising a frame including a longitudinal bed, the bed having a transverse recess therein intermediate its ends, a horizontal platform mounted on the frame for reciprocation between an initially lowered position and a raised position, means to reciprocate the platform, the platform when in lowered position being disposed in said recess flush with the bed, a driven conveyor on the frame arranged to feed each cylindrical body from the bed to the platform and from the latter to the bed in predetermined timed relation to reciprocation of said platform and when the latter is in lowered position, and means mounted on the platform operative to engage and center a cylindrical body on said platform upon and in response to upward movement thereof from its lowered position.

16. An elevating and centering device, for an upstanding cylindrical body, comprising a frame, a horizontal platform mounted on the frame for vertical reciprocation between an initially lowered position and a raised position, means to reciprocate the platform, a pair of upstanding gripping arms on each side of the platform in side by side but spaced relation, the gripping arms being pivotally mounted on the platform for swinging between an outward clearance position and an inward body engaging and centering position, the spacing of each pair of arms being such that when the same are in said last named position the body is engaged on the adjacent side at circumferentially spaced points which straddle the central transverse vertical plane of said body, and means operative to dispose the arms in said clearance position when the platform is lowered and in said body engaging and centering position when the platform is raised.

17. An elevating and centering device, as in claim 16, in which said last named means includes springs which yieldably urge the arms inwardly when in body engaging and centering position.

References Cited in the file of this patent

UNITED STATES PATENTS 2,641,371    Webster ---------------- June 9, 1953